No. 826,200. PATENTED JULY 17, 1906.
W. S. STROWGER.
DOUGH MIXER.
APPLICATION FILED MAY 5, 1904.

Witnesses:
Clarence W. Carroll.
L. Thow.

Inventor:
Walter S. Strowger

UNITED STATES PATENT OFFICE.

WALTER S. STROWGER, OF ROCHESTER, NEW YORK, ASSIGNOR TO HENRY H. PRYOR, OF ROCHESTER, NEW YORK.

DOUGH-MIXER.

No. 826,200.                    Specification of Letters Patent.                    Patented July 17, 1906.

Application filed May 5, 1904. Serial No. 206,467.

*To all whom it may concern:*

Be it known that I, WALTER S. STROWGER, a citizen of the United States, and a resident of Rochester, in the county of Monroe and State of New York, have invented certain new and useful Improvements in Dough-Mixers, of which the following is a specification.

This invention relates to dough-mixers; and it consists in the apparatus and combinations herein set forth and claimed.

Figure 1:
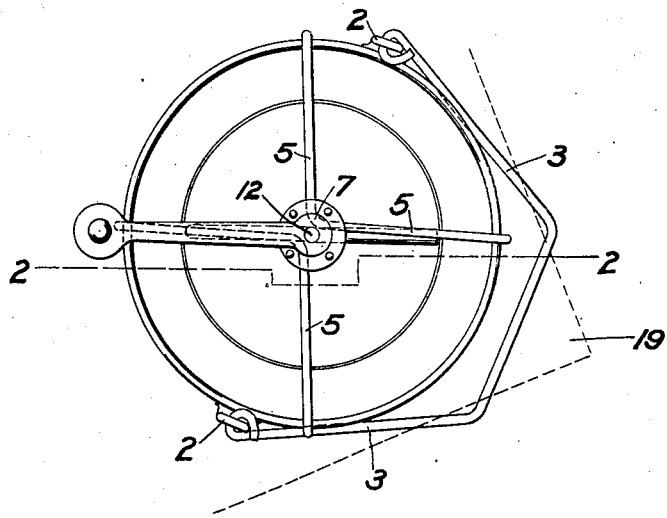
Figure 2:
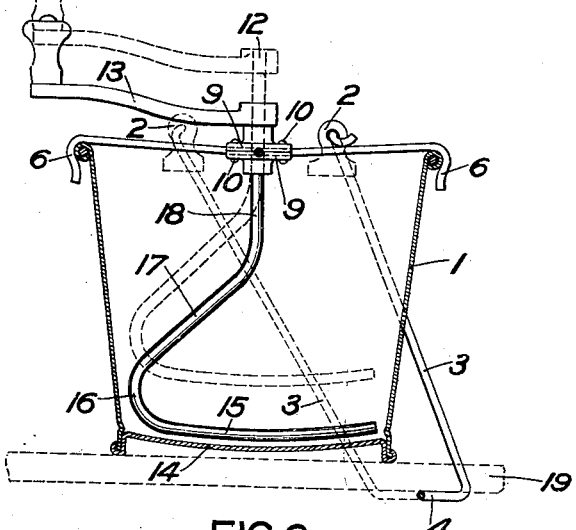
Figure 3:
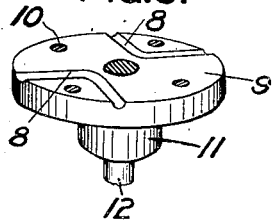

In the drawings, Figure 1 is a top plan view of a device embodying this invention. Fig. 2 is a vertical section on the line 2 2 of Fig. 1, and Fig. 3 is a perspective view of a detail.

In the drawings, 1 is a pail or pan of any suitable form in which the dough is to be mixed. This pail has a handle or bail attached to the ears 2 2 of the pail or pan 1, and the bail has two side parts 3 3 and a connecting part 4. The connecting part 4 may be straight or curved slightly upward and is adapted to engage under the corner of a table 19, as shown in dotted lines in Figs. 1 and 2, and then to hold the pail or pan 1 firmly upon the table 19.

Upon the mouth or top of the pail or pan is fastened a support consisting of the four arms 5 5, each having a downwardly-turned end 6, adapted to engage the top edge of the pail or pan and to fit upon the same. The ends 6 may be of sufficient length and of such curvature as to spring over the edge of the pail or pan and to hold the support thereon by such spring action, as shown most clearly in Fig. 2. For easy manufacture the said arms are made in pairs by bending a single piece of wire at the middle 7, Fig. 1, and placing said middle bend in a groove 8 in each of a pair of corresponding clamping-plates 9, which are held together in any suitable manner, such as by the rivets 10. The grooves 8 8 are of such depth as to hold the wire bend 7 firmly in place when the two parts 9 9 are bolted or riveted together, as shown. The two clamping-plates 9 have projecting hubs 11 11, and through the plates and hubs passes a stirring-rod 12. This rod passes freely through said hubs and plates, which constitute its support, guide, and bearing, and upon its upper end is fastened a handle 13. This handle may be fastened upon the rod in any suitable way, and said handle is adapted to bear upon the upper hub 11 and to prevent the stirring-rod 12 from descending too low in the pail, as hereinafter explained, but permitting said rod to rise to a suitable distance in said pail, as shown in dotted lines in Fig. 2.

The stirring-rod extends downward from the clamping-plates in a straight line, then curves away from the axis, and is then curved backward upon itself in order to lie parallel and close to the bottom 14 of the pail or pan. The portion lying close to said bottom may be called the "horizontal" member 15 of the stirring-rod, which is connected by the curved portion 16 with the diagonal portion 17 to the vertical or axle portion 18 of the stirring-rod.

The operation of the device is as follows: The pail or pan having been set upon the corner of the table 19 with the bail underneath said corner is pushed away from said corner until the bail clamps the pail or pan firmly to the table 19. The sides 3 of the bail press against the edge of the table 19, as indicated in the drawings. Flour and water are then put into the pail or pan, either together or by putting a quantity of one into the pail or pan and then a quantity of the other, and the handle 13 is turned, stirring the two materials together. The horizontal member 15 of the stirring-rod lies close to the bottom 14 of the pail, so as to stir together all the flour and the water that may be against it. As soon as the dough becomes thickened and stiff it will tend to lift the stirring-rod into the position shown in dotted lines in Fig. 2, and this action may be either automatic or be effected by the operator when the proper time has arrived in the mixing of the dough. When the stirring-rod has risen to said dotted-line position, on turning the handle the dough will be worked and will be turned over and over until it is in the proper condition. The stirring-rod moves up and down in a loose bearing in a support, consisting in the present case of the clamping-plates 9. This up-and-down motion moves the lower member 15 toward and from the bottom of the pail or the supporting-surface for the dough. The lower member is made of round wire and, being substantially straight, has no irregularities of form which will tend to prevent the ball of dough from turning upon it.

What I claim is—

1. The combination with a pail or pan, of the two clamping-plates having registering grooves, and the supporting-wires having bends lying in said grooves and spring ends adapted to engage over the upper edge of the pail or pan.

2. The combination with a pail or pan, of the two clamping-plates having registering grooves, and the supporting-wires having bends lying in said grooves and hooked spring ends adapted to engage over the upper edge of the pail or pan.

3. The combination of a pail or pan, a rotary stirring-rod having a substantially vertical member and a substantially uncurved horizontal member adapted to rotate parallel with the bottom of the pail or pan and to constitute the axis of rotation of a mass of dough, and a bearing-support for said rod carried by said pail or pan in which the rod slides vertically and automatically upward as the ball of dough on said horizontal member becomes thickened and stiff.

4. The combination of a pail or pan, a rotary stirring-rod having a substantially vertical member and a substantially uncurved horizontal member adapted to rotate parallel with the bottom of the pail or pan and to constitute the axis of rotation of a mass of dough and a diagonal member connecting the vertical and horizontal members, and a bearing-support for said rod carried by said pail or pan in which the rod slides vertically and automatically upward as the ball of dough on said horizontal member becomes thickened and stiff.

WALTER S. STROWGER.

Witnesses:
L. THON,
D. GURNEE.